(12) United States Patent
Hirai et al.

(10) Patent No.: US 11,936,072 B2
(45) Date of Patent: Mar. 19, 2024

(54) APPARATUS FOR SUPPLYING LIQUID

(71) Applicant: Nagano Automation Co., Ltd., Nagano (JP)

(72) Inventors: Kenichi Hirai, Nagano (JP); Kenya Yamaura, Nagano (JP)

(73) Assignee: Nagano Automation Co., Ltd., Nagano (JP)

(*) Notice: Subject to any disclaimer, the term of this patent is extended or adjusted under 35 U.S.C. 154(b) by 324 days.

(21) Appl. No.: 17/609,820

(22) PCT Filed: Sep. 30, 2020

(86) PCT No.: PCT/JP2020/037085
§ 371 (c)(1),
(2) Date: Nov. 9, 2021

(87) PCT Pub. No.: WO2021/070695
PCT Pub. Date: Apr. 15, 2021

(65) Prior Publication Data
US 2022/0247052 A1 Aug. 4, 2022

(30) Foreign Application Priority Data
Oct. 9, 2019 (JP) ................. 2019-185751

(51) Int. Cl.
*F04B 13/00* (2006.01)
*F04B 23/06* (2006.01)
*H01M 50/609* (2021.01)

(52) U.S. Cl.
CPC ........... *H01M 50/609* (2021.01); *F04B 13/00* (2013.01); *F04B 23/06* (2013.01)

(58) Field of Classification Search
CPC ................. F04B 13/00; F04B 23/06
(Continued)

(56) References Cited

U.S. PATENT DOCUMENTS 4,494,676 A * 1/1985 Berweger ............. B29B 7/7447
222/63
4,809,731 A * 3/1989 Walton .................. F04B 9/1053
417/489
(Continued)

FOREIGN PATENT DOCUMENTS

JP U-51-66055 5/1976
JP 08106896 A 4/1996
(Continued)

OTHER PUBLICATIONS

International Search Report for PCT/JP2020/037085, dated Dec. 8, 2020, 2 pgs.

*Primary Examiner* — Timothy L Maust
(74) *Attorney, Agent, or Firm* — Blank Rome LLP

(57) ABSTRACT

A liquid injection apparatus (1) includes: a first measuring unit (10a) including a first measuring space (13a) inside a first cylinder (11a) and a first piston (12a) moving in the first measuring space (13a); a second measuring unit (10b) including a second measuring space (13b) inside a second cylinder (11b) and a second piston (12b) moving in a second measuring space (13b); a first dispenser (20a) that injects a liquid (19) into a first vessel (90a); a second dispenser (20b) that injects the liquid into a second vessel (90b); a driving mechanism (30) that operates the first piston and the second piston in synchronization; and a first stroke conversion mechanism (60a) which is disposed between the first piston and the driving mechanism, and independently converts a first stroke of the driving mechanism and transmits the converted first stroke to the first piston to control an amount of movement of the first piston independently of an amount of movement of the second piston.

20 Claims, 3 Drawing Sheets

(58) Field of Classification Search
USPC .................................................. 141/234–244
See application file for complete search history.

(56) References Cited

U.S. PATENT DOCUMENTS

| | | | |
|---|---|---|---|
| 5,487,417 A | 1/1996 | Kasahara et al. | |
| 5,529,099 A * | 6/1996 | Janek | B65B 3/32 |
| | | | 141/238 |
| 5,996,652 A * | 12/1999 | Schromm | B65B 3/326 |
| | | | 141/105 |
| 6,145,284 A * | 11/2000 | Eggers | B65B 9/042 |
| | | | 141/238 |
| 6,213,166 B1 * | 4/2001 | Thibiant | A61Q 19/10 |
| | | | 141/105 |
| 8,746,295 B2 * | 6/2014 | Mueller | F04B 13/02 |
| | | | 141/94 |
| 8,826,948 B2 * | 9/2014 | Macquet | B67C 3/023 |
| | | | 141/234 |
| 9,505,506 B2 * | 11/2016 | Ammann | B65B 3/36 |

FOREIGN PATENT DOCUMENTS

| | | |
|---|---|---|
| JP | 08258893 A | 10/1996 |
| JP | 11247756 A | 9/1999 |
| JP | 2002089433 A | 3/2002 |
| JP | 2013-012340 A | 1/2013 |
| JP | 2017-075709 A | 4/2017 |

* cited by examiner

APPARATUS FOR SUPPLYING LIQUID

RELATED APPLICATIONS

This application is a national phase of PCT/JP2020/037085, filed on Sep. 30, 2020, which claims priority to Japanese Patent Application No. 2019-185751, filed on Oct. 9, 2019 The entire contents of these applications are hereby incorporated by reference.

TECHNICAL FIELD

The present invention relates to an apparatus that supplies a liquid.

BACKGROUND ART

Japanese Laid-open Patent Publication No. 201342340 discloses an apparatus capable of controlling an injected amount of an electrolysis solution with improved accuracy. This injecting apparatus includes a measuring unit where a piston moves in a measuring space inside a cylinder, a dispenser that injects an electrolyte a first pipeline that connects an upper end of the measuring space and the dispenser, a back pressure valve that is disposed on the first pipeline and operates according to changes in back pressure that accompany movement of the piston, an inlet valve that turns on and turns off the solution that flows into the measuring space via a second pipeline, and a releasing unit that temporarily sets the back pressure valve at open using an operating rod.

SUMMARY OF INVENTION

There is demand for an apparatus capable of rapidly injecting an electrolyte or the like into a large number of vessels.

One aspect of the present invention is an apparatus that simultaneously supplies a liquid (solution) to a plurality of vessels. The apparatus includes: a first measuring unit including a first measuring space inside a first cylinder that is replenished with the liquid and a first piston moving in the first measuring space; a second measuring unit including a second measuring space inside a second cylinder that is replenished with the liquid and a second piston moving in the second measuring space; a first dispenser that is connected to the first measuring space and injects the liquid into a first vessel; a second dispenser that is connected to the second measuring space and injects the liquid into a second vessel; a driving mechanism that operates the first piston and the second piston in synchronization so as to move up and down with a first stroke; and a first stroke conversion mechanism which is disposed between the first piston and the driving mechanism and independently converts the first stroke of the driving mechanism, and transmits the converted first stroke to the first piston to control an amount of movement of the first piston independently of an amount of movement of the second piston.

This apparatus operates a plurality of measuring units (or measuring devices) at the same time (in parallel) with a shared or common driving mechanism, which makes it possible to reduce the number of driving mechanisms with respect to the number of measuring units. This is not only economical, but also makes it possible to improve the spatial density with which the measuring units are arranged. It is therefore possible for the apparatus to rapidly inject liquid into a large number of vessels. In addition, by providing a measuring unit for each vessel out of the plurality of vessels, it is possible to accurately measure and supply (or inject) a volume of liquid to be injected into each vessel. For an apparatus that drives a plurality of pistons of a plurality of measuring units at the same time (in parallel) with a constant stroke using a shared driving mechanism, high precision is required to control the amount injected into the individual vessels and it is necessary for the sizes (dimensions, diameters) of the measuring spaces of all the measuring units to be highly accurate and uniform, which is difficult to realize at low cost. In this apparatus, the stroke conversion mechanism is provided between the piston and the driving mechanism to convert and transmit the first stroke of the driving mechanism independently for each piston. By the conversion mechanism, differences in size or dimensions between the measuring spaces can be easily absorbed, or conversely, the injected amounts can be controlled with high accuracy by intentionally providing differences in size or dimensions between the measuring spaces. That is, a first stroke conversion mechanism is provided to independently convert and transmit the first stroke of the driving mechanism to the first piston, which makes it possible to control the amount of movement of the first piston independently of the amount of movement of the second piston.

One embodiment of the first stroke conversion mechanism includes: a connecting mechanism that incorporates a spring and is disposed between the driving mechanism and the first piston; and a stopper that stops movement of the first piston at a predetermined position. By providing the spring in the connecting mechanism that moves with the first stroke provided by the driving mechanism, it is possible to compress the spring and convert the stroke (that is, the amount of movement) using the stopper. Accordingly, the amount of movement of the first piston can be controlled (that is, limited) independently of the amount of movement supplied by the driving mechanism, and possible to control the stroke (that is, the amount of movement) of the first piston individually (that is, independently) with respect to the stroke (that is, the amount of movement) of the second piston. The dimensions or size of the first measuring space and the dimensions or size of the second measuring space may be different, or the first measuring space with the different size or dimension to that of the second measuring space may be used together with the second measuring space.

A stroke conversion mechanism may be disposed between the second piston and the driving mechanism. A direct coupling mechanism that directly controls the second piston using the driving mechanism may be provided. In an apparatus where the second piston is directly operated by the driving mechanism without a stroke conversion mechanism in between, the movement of the driving mechanism can be guided by the movement of the second piston, That is, it makes possible to suppress destabilization of the movement of the driving mechanism due to a spring or the like included in the stroke conversion mechanism, and may ensure that the measurement in each measuring unit is accurate. In order to directly control the second piston with the first stroke of the driving mechanism, the first measuring space may be larger than the second measuring space.

The apparatus may also include: a third measuring unit including a third measuring space inside a third cylinder that is replenished with the liquid and a third piston moving in the third measuring space; and a third dispenser that is connected to the third measuring space and injects the liquid into a third vessel. The driving mechanism operates the first piston, the second piston, and the third piston in synchronization. The apparatus may further include a third stroke conversion mechanism which is disposed between the third piston and the driving mechanism, independently converts the first stroke of the driving mechanism, and transmits the converted first stroke to the third piston. By doing so, it is possible to control an amount of movement of the third piston independently of the amount of movement of the first piston and the amount of movement of the second piston.

The first measuring unit and the third measuring unit may be disposed at symmetrical positions with the second measuring unit in the center. As one example, the first measuring unit, the second measuring unit, and the third measuring unit may be disposed in that order in a straight line. The second piston of the second measuring unit in the center may be directly operated by the driving mechanism using a direct coupling mechanism without a stroke conversion mechanism in between. It is possible to use the second piston as a guide to stabilize the movement of the driving mechanism and maintain the measurement accuracy of each measuring unit. Typically, the second measuring space may be smaller than the first and third measuring spaces.

The apparatus can be used as an apparatus that injects electrolyte (electrolysis solution) into battery cases. Accordingly, as a system that manufactures battery cells by injecting an electrolyte into battery cases in which electrodes are incorporated, it is possible to provide a system including the apparatus described above that injects an electrolyte as the liquid (chemical or solution) into battery cases (or battery cans) as the vessels.

DESCRIPTION OF EMBODIMENTS

Figure 1:
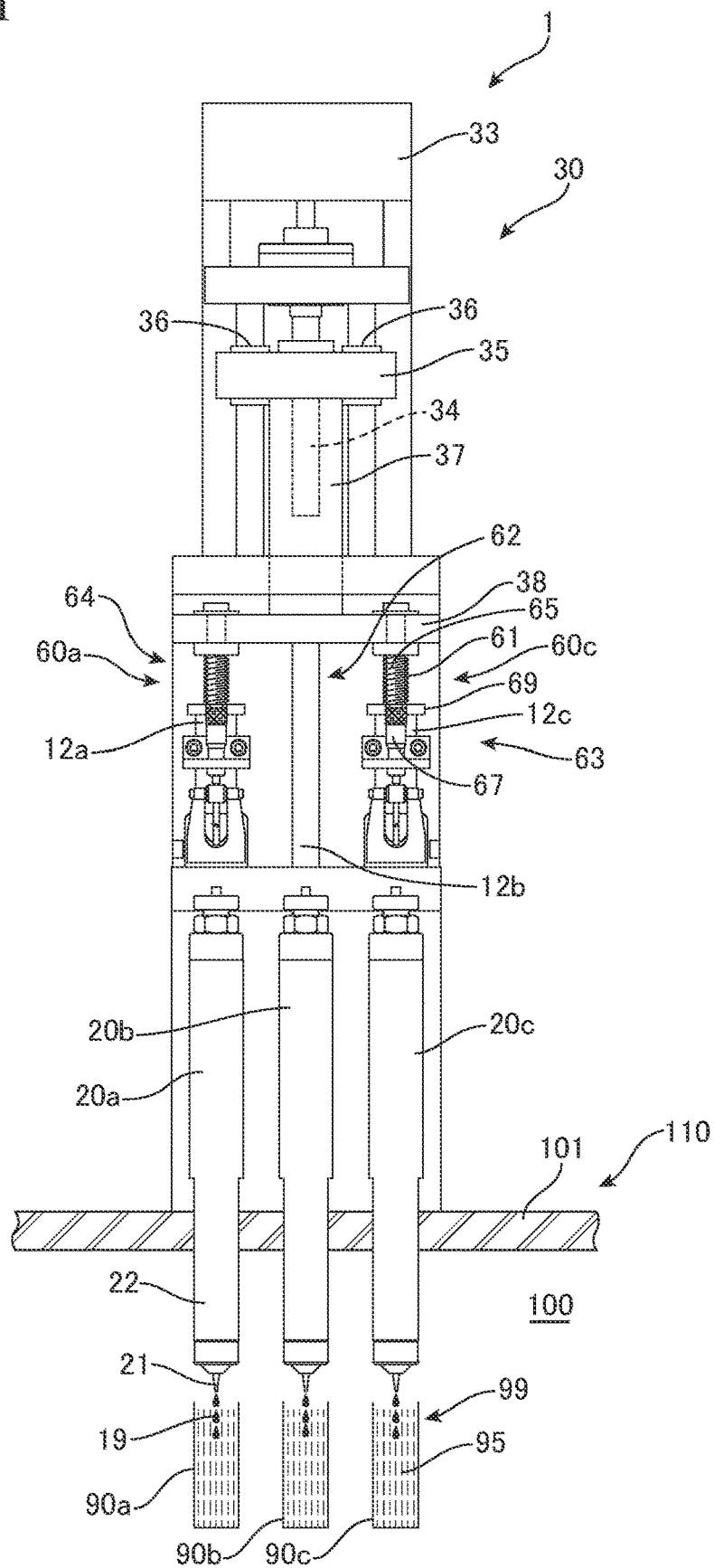
FIG. 1 is a front view of a liquid injection apparatus.
Figure 2:
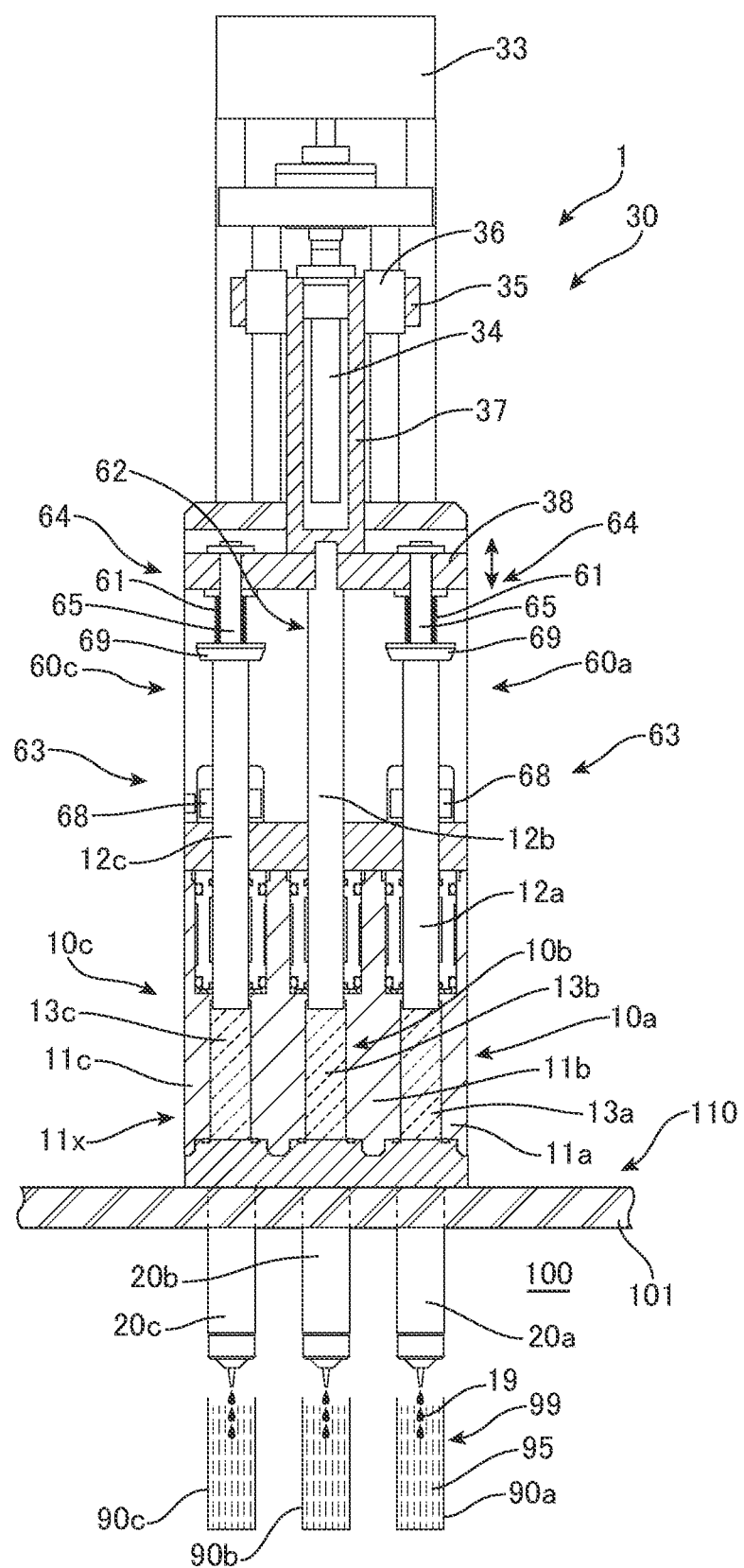
FIG. 2 is a rear view of the liquid injection apparatus.
Figure 3:
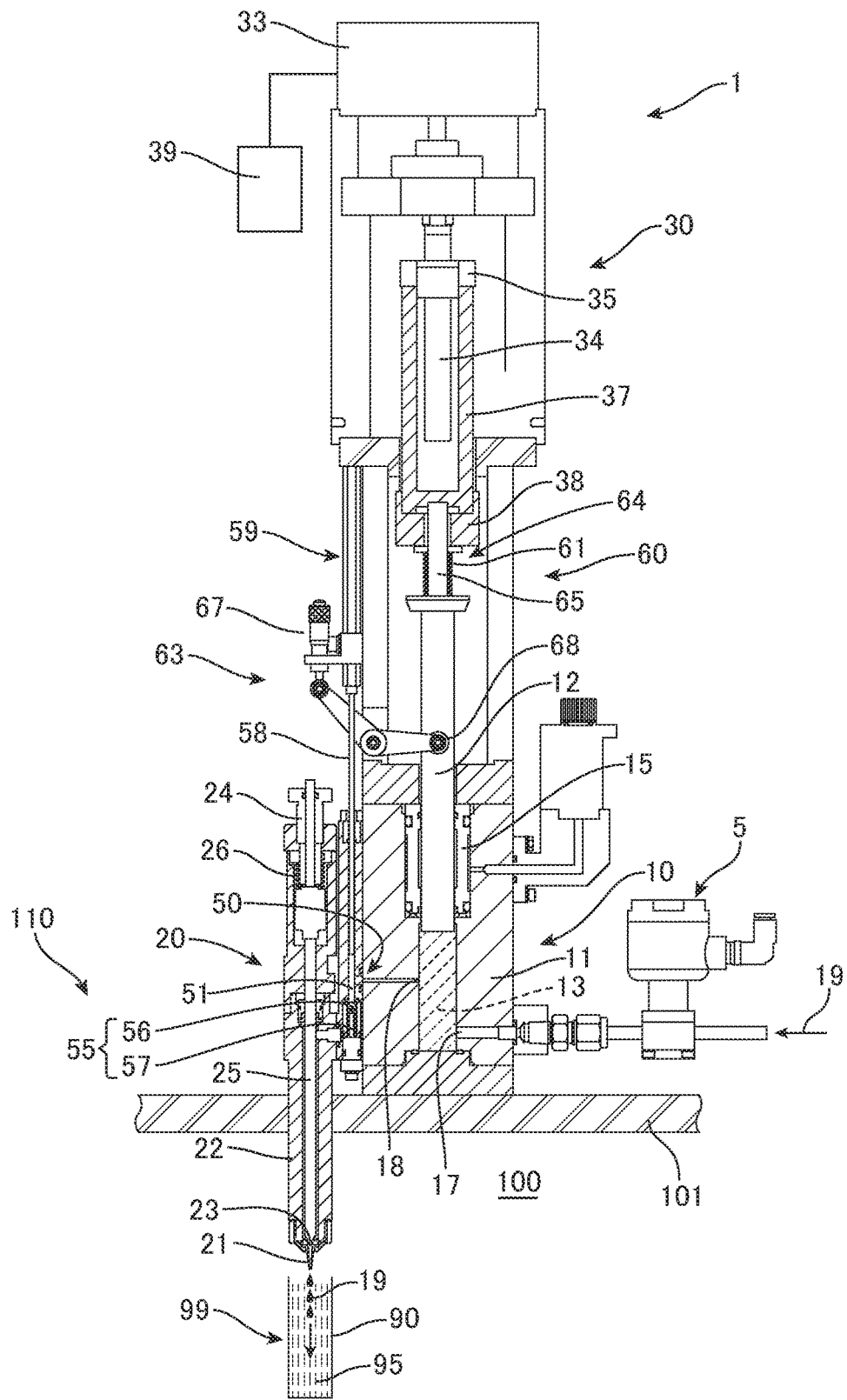
FIG. 3 is a side view of the liquid injection apparatus.

FIG. 1 is a front view depicting an apparatus (triple plunger pump, electrolyte supplying apparatus, liquid injection apparatus, liquid injector, liquid feed apparatus, liquid feeder, solution injecting apparatus or supplying apparatus) according to an embodiment of the present invention, FIG. 2 is a rear view, and FIG. 3 is a side view. First, the overall configuration of the apparatus will be described with reference to FIG. 3. One example of this apparatus 1 is a liquid injection apparatus (chemical injection equipment or device) used in a system 110 that manufactures battery cells 99. The liquid injection apparatus (liquid injector, chemical injector) 1 is an apparatus (plunger pump) that supplies or feeds an electrolyte (electrolysis solution) 19 into battery vessels (battery cases or battery cans) 90 in which electrodes 95 have been incorporated respectively. In the system 110, the battery vessels 90 are disposed inside a decompression chamber 100, and the pressure inside the decompression chamber 100 is reduced by a vacuum pump to reach a predetermined pressure (negative pressure or reduced pressure atmosphere), The system 110 includes a plurality of liquid injection apparatuses 1 placed at an appropriate pitch on an upper wall 101 of the decompression chamber 100, so that the electrolyte 19 is injected into a large number of battery vessels 90 inside the decompression chamber 100 simultaneously or in parallel. Note that in the following description, one liquid injecting apparatus 1 that has been extracted as an example is described.

Each liquid injection apparatus 1 includes measuring units (measuring devices) 10, which are disposed above the upper wall (top plate) 101 of the decompression chamber 100, dispensers 20, which are disposed downstream of the measuring units 10, and a driving mechanism (driver) 30. The electrolyte 19, which is replenished (replaced or refilled) from a reservoir (reservoir tank, not illustrated) disposed upstream of the measuring units 10, is measured and injected via the dispensers 20 into the vessels 90. The measuring units 10 respectively include cylinders 11 and pistons 12. Each cylinder 11 extends vertically, and each piston 12 moves inside a cylinder 11 in the up-down direction (perpendicular direction), As indicated by the thin broken shading, the region where each piston 12 moves inside each cylinder 11 forms each measuring space 13 of each measuring unit 10, and it is possible to freely control (adjust) each amount of the electrolyte 19 to be measured in each measuring space 13 by controlling each amount of movement (stroke distance or distance of movement) of each piston 12.

Each piston 12 extends upward through a space 15 in which a sealant is held and is actuated or operated by the driving mechanism 30, which includes a servomotor 33. One example of the servomotor 33 is a stepping motor, whose amount of rotation, rotational speed, and direction of rotation are controlled by a control unit 39. The servomotor 33 operates so that each piston 12 moves up and down with a predetermined stroke (first stroke). The first stroke (or distance of movement) provided by the driving mechanism 30 can be accurately controlled through pulse control of the servomotor 33. The liquid injection apparatus 1 accurately supplies a predetermined amount of the electrolyte 19 to the vessels 90 by injecting the electrolyte 19 that has been measured by each measuring unit 10 into the vessel 90 in a single injecting operation or a plurality of operations. A typical control unit 39 includes hardware resources including a CPU and a memory, and controls the liquid injection apparatus 1 by executing a program (or program product).

The electrolyte 19 that has been measured by each measuring unit 10 is injected from above into a battery vessel 90 by each dispenser 20. Each dispenser 20 includes a discharge nozzle 21 disposed inside the battery vessel 90 or in the vicinity of the upper end of the battery vessel 90, a straight tube (cylinder or syringe, hereinafter syringe) 22 that has the discharge nozzle 21 attached to a lower end thereof, a needle valve (stop valve) 23 that is disposed inside the discharge nozzle 21 and opens and closes the front end of the discharge nozzle 21, a valve control rod 25 provided so as to pass through the inside of the syringe 22 in the up-down direction, and an actuator 24 that drives the needle valve 23 up and down via the valve control rod 25 to control the opening and closing of the needle valve 23, The needle valve 23 is normally off (normally closed) and includes means (for example, a coil spring) 26 that biases the needle valve 23 toward the front end of the discharge nozzle 21 via the valve control rod 25.

Each syringe 22 extends in the up-down direction through an upper wall 101 of the decompression chamber 100, and a front end (tip end) of the syringe 22 reaches a battery vessel 90 that has been disposed inside the decompression chamber 100. Accordingly, the lower end (front end) of each syringe 22 which forms the front end of a dispenser 20 extends below the lower end of the measuring space 13 of each measuring unit 10 disposed on the upper wall 101, so that the electrolyte 19 that has filled the measuring space 13 flows under static pressure (that is, a static head) into the battery vessel 90. In addition to this, a reduced-pressure atmosphere is formed in the periphery of the discharge nozzle 21 that forms the front end (lower end) of the syringe 22, so that the electrolyte 19 is injected into the battery vessel 90 of the decompression chamber 100 due to the difference in pressure. By also closing a space directly above the discharge nozzle 21 using the needle valve 23 provided inside the syringe 22, it is possible to suppress leaking of the electrolyte 19 from the discharge nozzle 21, even when the discharge nozzle 21 faces a reduced-pressure atmosphere, which improves the shutting off of the liquid. In addition, by opening the needle valve 23 before injection, gas such as air can be bled from the inside of the liquid injection apparatus 1, including the measuring space 13, using the negative pressure of the decompression chamber 100.

Each dispenser 20 is connected to each measuring space 13 via a port 18 provided on in an upper part of the measuring space 13 of a measuring unit 10. Each measuring space 13 is replenished or refilled with the electrolyte 19 from a reservoir via a port 17 provided at a lower part of the measuring space 13. A connecting passage 50 that connects each dispenser 20 and the port 18 of each measuring unit 10 includes a back pressure valve 55 disposed at a position on a pipeline 51 that extends in the up-down direction corresponding to the vicinity of a lower end of the measuring space 13.

The back pressure valve 55 includes a ball 56, which is the valve body, and a coil spring 57, which upwardly biases the ball 56 to keep the back pressure valve 55 in a closed (off) state. The coil spring 57 is set to apply a sufficient pressure to the ball 56 so that the electrolyte 19 does not flow through the back pressure valve 55 unless the piston 12 of the measuring unit 10 operates (that is, the piston 12 is performing a stroke, which in this example is downward movement), As one example, the back pressure valve 55 is set so that the electrolyte 19 does not flow even if a pressure difference between the maximum negative pressure (that is, degree of vacuum) of the decompression chamber 100 and atmospheric pressure is applied as the back pressure. The back pressure valve 55 operates as a check valve when an abnormal situation has occurred where the negative pressure in the decompression chamber 100 breaks and becomes atmospheric pressure. Also, when the liquid injecting apparatus 1 is used outside the decompression chamber 100, as one example, to inject a liquid into the vessels 90 at atmospheric pressure, each back pressure valve 55 acts as a check valve when an abnormal situation has occurred where the internal pressure of a syringe 22 has become higher than the internal pressure of a measuring space 13.

The liquid injection apparatus 1 further includes the releasing unit 59 capable of removing gas, such as air, from the liquid injection apparatus 1 by temporarily setting (fixing) the back pressure valve 55 in the open state to reduce the pressure in the liquid injection apparatus 1 using the negative pressure in the decompression chamber 100, The releasing unit 59 includes an operating rod 58 that operates the ball 56, which is the valve body of the back pressure valve 55, through the straight pipeline 51. When injecting liquid, the operation rod 58 may be completely retracted, or the front end (tip end) of the operation rod 58 may be placed in the straight pipeline 51. When the operating rod 58 is pulled up from the straight pipeline 51, the back pressure valve 55 operates normally as back pressure valve, A part of the operation rod 58 may be inserted into the straight pipeline 51, and the cross-sectional area of the straight pipe 51 through which the electrolyte 19 passes can be reduced, which makes it possible to control a loss of pressure when the electrolyte 19 passes through the straight pipeline 51. As one example, if the pressure in the decompression chamber 100 changes for some reason, there is the possibility of a change, even if slight, in the force applied to the back pressure valve 55. In such cases, the position of the piston 12 that moves in the measuring space 13 and the timing at which the back pressure valve 55 opens and closes can be controlled by the position of the operating rod 58.

The liquid injection apparatus 1 injects (dispenses) the electrolyte 19 into the battery vessels 90 in a single operation or a plurality of operations. By moving the pistons 12 in an upward stroke using the driving mechanism 30, a predetermined amount of the electrolyte 19 is caused to flow into the measuring spaces 13. While the pistons 12 are performing an upward stroke, a back pressure reaching to open the back pressure valves 55 is not applied to the back pressure valves 55, which keeps the back pressure valves 55 in the closed state. The electrolyte 19 flows in from the inlet port 17 on the lower side of each measuring space 13 via the inlet valve 5. After stopping the piston 12 and closing the inlet valve 5, the needle valve 23 is opened. This shuts off the measuring space 13 from the part of the system upstream of the inlet valve 5 and prevents static pressure from being applied to the system upstream of the inlet valve 5. The cross-sectional area of the measuring space 13 composed of the cylinder 11 and the piston 12 is at least one and usually two, three, or more orders of magnitude larger than the cross-sectional area of the feeding pipes. By temporarily accumulating the electrolyte 19, which is to be dispensed, in the measuring space 13 that has a large cross-sectional area, the static pressure of the electrolyte 19 (that is, the pressure caused by the column of liquid) applied to the needle valve 23 is minimized. The pressure applied to the needle valve 23 is further suppressed by the back pressure valve 55.

After the needle valve 23 has been opened, the piston 12 is moved on a downward stroke. The back pressure valve 55 opens when a predetermined back pressure is applied, and an amount of electrolyte 19 corresponding to the movement of the piston 12 is stably discharged from the front end of the discharge nozzle 21. The back pressure valve 55 opens and closes instantly (immediately) in response to the movement of the piston 12, Accordingly, when the stroke of the piston 12 stops, the back pressure valve 55 can isolate the measuring unit 10 and the dispenser 20 (in terms of pressure) almost instantly. This means that even when the front end of the dispenser 20 is located in a state of reduced pressure (that is, a vacuum), the electrolyte 19 in the measuring space 13 may not be drawn by the reduced pressure and flowing out of the electrolyte 19 may be prevented.

As depicted in FIGS. 1 and 2, the liquid injection apparatus 1 includes three pairs (sets) of measuring units 10a to 10c and dispensers 20a to 20c, and the driving mechanism 30 is configured to drive synchronously (that is, simultaneously) these sets. The dispensers 20a to 20c are capable of injecting the liquid 19 into different vessels in a plurality of vessels 90a to 90c, The liquid injection apparatus 1 is an apparatus that simultaneously supplies or feeds the liquid 19 to the plurality of vessels 90a to 90c, and includes the first measuring unit 10a where a first piston 12a moves in a first measuring space 13a in a first cylinder 11a that is replenished with the electrolyte liquid 19, the second measuring unit 10b where a second piston 12b moves in a second measuring space 13b in a second cylinder 11b that is replenished with the electrolyte 19, and a third measuring unit 10c where a third piston 12c moves in a third measuring space 13c in a third cylinder 11c that is replenished with the electrolyte 19.

The first measuring unit 10a and the third measuring unit 10c are disposed at positions that are symmetrical with respect to the second measuring unit 10b. In the present embodiment, the first measuring unit 10a, the second measuring unit 10b, and the third measuring unit 10c are placed in that order in a linear arrangement. The first measuring unit 10a, the second measuring unit 10b, and the third measuring unit 10c may also be disposed so as to form an isosceles triangle with the second measuring unit 10b as the apex.

The liquid injection apparatus 1 further includes the first dispenser 20a that is connected to the first measuring space 13a and injects the liquid 19 into the first vessel 90a, the second dispenser 20b that is connected to the second measuring space 13b and injects the liquid 19 into the second vessel 90b, and the third dispenser 20c that is connected to the third measuring space 13c and injects the liquid 19 into the third vessel 90c, The liquid injecting apparatus 1 further includes the driving mechanism 30 that operates the first piston 12a, the second piston 12b, and the third piston 12c synchronously and simultaneously (that is, in parallel), a first stroke conversion mechanism (stroke convertor, stroke control mechanism) 60a that is disposed between the first piston 12a and the driving mechanism 30 and controls the distance moved by the first piston 12a independently of the distances moved by the other pistons 12b and 12c, and a third stroke conversion mechanism (stroke convertor, stroke control mechanism) 60c that is disposed between the third piston 12c and the driving mechanism 30 and controls the distance moved by the third piston 12c independently of the distances moved by the other pistons 12a and 12b, The stroke conversion mechanisms 60a and 60c independently convert the first stroke supplied by the driving mechanism 30 and transmit the converted strokes to the pistons 12a and 12c, respectively. The liquid injection apparatus 1 further includes a direct coupling mechanism 62 that directly controls the second piston 12b using the driving mechanism 30. That is the second piston 12b is directly operated by the driving mechanism 30 without converting the stroke by a stroke conversion mechanism.

The driving mechanism 30 includes a servomotor 33, a ball screw 34 that is driven by the servomotor 33, a carriage 35 that is driven up and down by the ball screw 34, a pair of ball splines 36 that support the carriage 35 on the left and right, a hollow shaft 37 that moves integrally with the carriage 35 and is disposed so as to be coaxial with the ball screw 34, and a connecting block 38 to which the pistons 12a to 12c are connected so that the pistons 12a to 12c are synchronously moved (that is, moved simultaneously and in parallel) via the shaft 37. The second piston 12h is directly coupled or fixed to the connecting block 38, and the first piston 12a and the third piston 12c are connected to the connecting block 38 via the stroke conversion mechanisms 60a and 60c, respectively.

The first stroke conversion mechanism 60a and the third stroke conversion mechanism 60c have the same configuration, which includes a coupling mechanism 64, which is disposed between the driving mechanism 30 and the respective pistons 12a and 12c and incorporates a spring 61, and a stopper 63, which stops the movement of the respective pistons 12a and 12c at a predetermined position. Each coupling mechanism 64 includes a spring (a coil spring) 61 disposed so as to be interposed between a flange (ring or protrusion) 69 of the piston 12a or 12c and the connecting block 38, and a connecting rod 65 disposed so as to pass through the coil spring 61. The coupling mechanism 64 including the spring 61 and the connecting rod 65 realizes a link-type suspension mechanism where the maximum length (distance or spacing) is defined by the connecting rod 65. The coil spring 61 and the connecting rod 65 may be disposed coaxially or in parallel. The stopper 63 includes an engagement portion (locking portion or stopper portion) 68 that contacts the flange 69 of the piston 12a or 12c, which also serves as a support for the coil spring 61, and thereby controls the movement (that is, the distance of movement, or the amount of movement) of respective piston, and a position control mechanism (micrometer) 67 that controls the position of the engaging portion 68.

Out of the measuring spaces 13a to 13c of the three measuring units 10a to 10c, the capacity of the second measuring space 13b in the center is set smaller than the capacities of the first measuring spaces 13a and the third measuring space 13c on the left and right. As one example, within the range of manufacturing tolerances, a measuring unit 10 equipped with the measuring space 13 with a small capacity is disposed in the center and measuring units 10 with measuring spaces 13 with larger capacities are disposed on the left and right. In the liquid injection apparatus 1, when the servo motor 33 operates and the carriage 35 moves downward to drive the three pistons 12a to 12c downward via the connecting block 38, the amounts of liquid discharged from the measuring spaces 13a and 13c of the left and right measuring units 10a and 10c that have large capacities will reach a predetermined value first compared to the amount of liquid discharged from the measuring space 13b of the measuring unit 10b in the center. For this reason, the stroke distance (first stroke) of the driving mechanism 30 is converted into a shorter stroke distance by the coupling mechanism 64 and the stopper 63 of the stroke conversion mechanisms 60a and 60c, which makes it possible to stop (restrict) the movement or displacement of the pistons 12a and 12c at a position (or moved distance) restricted by the stopper 63.

The stroke distance of the driving mechanism 30 (first stroke or operated amount of the servomotor 33) is set according to the distance moved by the piston 12b of the measuring unit 10b in the center that has the smallest capacity. This means the driving mechanism 30 drives the piston 12b via the connecting block 38 and the direct coupling mechanism 62 and lowers the piston 12b until a predetermined amount of the electrolyte 19 has been discharged from the measuring space 13b, During this operation, the springs 61 of the stroke conversion mechanisms 60a and 60c contract and the pistons 12a and 12c will not move down after movement has been stopped by the stopper 63, even if the connecting block 38 moves down further. Accordingly, the stroke conversion mechanisms 60a and 60c absorb the differences in stroke required to discharge a predetermined amount of liquid from the pistons 12a to 12c.

When a predetermined amount of liquid 19 has been discharged (injected) into each of the vessels 90a to 90c, the servomotor 33 of the driving mechanism 30 changes direction and the connecting block 38 is raised via the ball screw 34, the carriage 35, and the shaft 37. Since the second piston 12b in the center is directly coupled to the connecting block 38, the second piston rises together with the connecting block 38, and the first piston 12a and the third piston 12c on the left and right rise together with the connecting block 38 via the connecting rod 65 of the coupling mechanism 64, When the measuring spaces 13a to 13c have been replenished with the electrolyte 19, the connecting block 38 is once again lowered by the servomotor 33 of the driving mechanism 30, so that the electrolyte 19 that has been accurately measured by the measuring spaces 13a to 13c is simultaneously injected into the three vessels 90a to 90c in the same manner as described above.

Manufacturing tolerances will unavoidably occur for the cylinders 11a to 11c and the pistons 12a to 12c that construct respective measuring spaces 13a to 13c. It may be possible to machine the cylinders 11a to 11c and the pistons 12a to 12c with high precision so that the differences in volume between the measuring spaces 13a to 13c are within the tolerance for the amount of liquid to be injected. However, to do this, a higher precision is required than the precision demanded for a cylinder and a piston intended for injecting a liquid, and this can involve a great deal of cost and time. For the liquid injection apparatus 1, it is assumed that a degree of tolerance exists for the measuring spaces 13a to 13c, and the apparatus is designed so that this tolerance can be absorbed by controlling the strokes of the pistons 12a and 12c independently using the stroke conversion mechanisms 60a and 60c. Accordingly, a liquid injecting apparatus 1 that includes the measuring units 10a to 10c that construct three pumps and is able to precisely match the amounts to be injected from the respective measuring units 10a to 10b can be manufactured and provided using a normal level of machining precision for a liquid injecting apparatus.

In addition, in the liquid injection apparatus 1, in order to make clear adjustments with the stroke conversion mechanisms 60a and 60c, it is desirable for the sizes, dimensions or diameters of the measuring spaces 13a and 13c of the measuring units 10a and 10c on both sides to be clearly larger than the size, dimensions or diameter of the measuring space 13b of the second measuring unit 10b in the center that is directly controlled by the driving mechanism 30. Accordingly, the liquid injection apparatus 1 may be configured by combining measuring units 10 whose measuring spaces 13 have different sizes, dimensions or diameters from a design stage.

It is also possible to install a stroke conversion mechanism 60 on any of the three pistons 12a to 12c to enable the respective pistons 12a to 12c to be controlled independently. However, a stroke conversion mechanism 60 will often use a member, such as a spring, with low rigidity to convert the stroke and a variable length to control the interval. Accordingly, the load placed on the connecting block 38 will fluctuate on a piston-by-piston basis, which may obstruct the connecting block 38 from moving up and down in a horizontal state. To stably provide a fixed stroke to the pistons 12a to 12c, it is desirable for the connecting block 38 of the driving mechanism 30 to always move up and down in a horizontal state. When the connecting block 38 becomes tilted, this can be a factor causing fluctuation in the amount of liquid injected into the vessels 90a to 90c via the respective dispensers 20a to 20c.

In this liquid injection apparatus 1, the ball splines 36 are disposed on both sides of the carriage 35 that is moved up and down by the servomotor 33, so that the carriage 35 moves up and down in an extremely stable state across the horizontal direction. In addition, the second piston 12b that is attached (arranged, disposed) to the center of the connecting block 38 that moves up and down in concert with the carriage 35 is directly, without using conversion mechanism, coupled to the connecting block 38. That is, the liquid injection apparatus 1 has a symmetrical arrangement with the first measuring unit 10a and the third measuring unit 10c disposed at symmetrical positions centered on the second measuring unit 10b, and the second piston 12b is directly coupled to the driving mechanism 30 by the direct coupling mechanism 62, The second piston 12b disposed at the center of symmetry is directly coupled to the connecting block 38 without a stroke conversion mechanism 60 being provided, so that the piston 12b in the center may also serve as a guide when the connecting block 38 moves up and down.

The pistons that are directly coupled and also serve as guides may be disposed on the left and right sides of the connecting block 38. Such configuration may require that the left and right measuring units should be with zero tolerance. By disposing the piston 12b, which serves as a guide, in the center of the pistons 12a to 12c that are aligned in a row in the left-right direction and disposing the stroke conversion mechanisms 60a and 60c that include springs on the left and right, it is possible to suppress fluctuations in the load that acts on the connecting block 38 and to adjust the balance of the load, so that the connecting block 38 can be moved up and down as smoothly as possible in a horizontal state.

In this way, by connecting the three measuring units 10a to 10c that can have different capacities, it is possible to drive the liquid injection apparatus 1 using a single driving mechanism 30. In addition, using the respective measuring units 10a to 10c, the electrolyte 19 that has been measured accurately and consistently can be injected into the three vessels 90a to 90c at the same time (in parallel) respectively. With this liquid injection apparatus 1, it is possible to reduce the number of driving mechanisms 30, which each occupy a large space, and to dispose the measuring units 10a to 10c at minimum intervals, so that the efficiency of a liquid injecting operation for a plurality of vessels 90 can be greatly improved, including the efficiency with which space is used. By further reducing the number of driving mechanisms 30, it is possible to reduce the equipment cost and running cost required to inject liquid.

Although the liquid injection apparatus 1 in which the three measuring units 10a to 10c are disposed in a row has been described as an example, the present invention may be a liquid injection apparatus in which two measuring units are operated, controlled or moved by a single driving mechanism 30 at the same time or may be a liquid injection apparatus in which four or more measuring units 10 are operated, controlled or moved by a single driving mechanism 30, As one example, the present invention may be a liquid injection apparatus where five measuring units 10 are disposed in a cross, the piston 12 of the measuring unit 10 in the center is directly operated by the connecting block 38, and the pistons 12 of the other measuring units 10 are operated via stroke conversion mechanisms. Also, although the system 110 where the electrolyte 19 is injected to manufacture the battery cells 99 has been described as an example in the present embodiment, the injected liquid is not limited to an electrolyte. Also, although the cylinders 11a to 11c that form the plurality of measuring spaces 13a to 13c are constructed of a single member as a cylinder block lix in the present embodiment, the cylinders 11a to 11c may be constructed of a plurality of members or blocks. That is, the second cylinder 11b may be a block that is shared with the first cylinder 11a, or may be a separate block (independent block). In the same way, the third cylinder 11c may be a block that is shared with the first cylinder 11a and the second cylinder 11b, or may be a separate block.

Although specific embodiments of the present invention have been described above, various other embodiments and modifications will be conceivable to those of skill in the art without departing from the scope and spirit of the invention. Such other embodiments and modifications are addressed by the scope of the patent claims given below, and the present invention is defined by the scope of these patent claims.

The invention claimed is:

1. An apparatus that simultaneously supplies a liquid to a plurality of vessels, comprising:
   a first measuring unit including a first measuring space inside a first cylinder that is replenished with the liquid and a first piston moving in the first measuring space;

a second measuring unit including a second measuring space inside a second cylinder that is replenished with the liquid and a second piston moving in the second measuring space;

a first dispenser that is connected to the first measuring space and injects the liquid into a first vessel;

a second dispenser that is connected to the second measuring space and injects the liquid into a second vessel;

a driving mechanism that operates the first piston and the second piston in synchronization so as to move up and down with a first stroke; and a first stroke conversion mechanism that is disposed between the first piston and the driving mechanism and independently converts the first stroke of the driving mechanism, and transmits the converted first stroke to the first piston to control an amount of movement of the first piston independently of an amount of movement of the second piston, wherein a size of the first measuring space and a size of the second measuring space differ.

2. The apparatus according to claim 1,
wherein the first stroke conversion mechanism includes:
a connecting mechanism that incorporates a spring and is disposed between the driving mechanism and the first piston; and
a stopper that stops movement of the first piston at a predetermined position.

3. The apparatus according to claim 1,
further comprising a direct coupling mechanism that directly controls the second piston using the driving mechanism.

4. The apparatus according to claim 3,
wherein the first measuring space is larger than the second measuring space.

5. The apparatus according to claim 1,
wherein the first measuring space is larger than the second measuring space.

6. The apparatus according to claim 1, further comprising:
a third measuring unit including a third measuring space inside a third cylinder that is replenished with the liquid and a third piston moves in the third measuring space; and
a third dispenser that is connected to the third measuring space and injects the liquid into a third vessel,
wherein the driving mechanism operates the first piston, the second piston, and the third piston in synchronization so as to move up and down with the first stroke; and
the apparatus further comprises a third stroke conversion mechanism that is disposed between the third piston and the driving mechanism, independently converts the first stroke of the driving mechanism, and transmits the converted first stroke to the third piston to control an amount of movement of the third piston independently of the amount of movement of the first piston and the amount of movement of the second piston.

7. The apparatus according to claim 6,
wherein the first measuring unit and the third measuring unit are disposed at symmetrical positions with the second measuring unit in the center.

8. The apparatus according to claim 6,
wherein the first measuring unit, the second measuring unit, and the third measuring unit are disposed in that order in a straight line.

9. The apparatus according to claim 6,
further comprising a direct coupling mechanism that directly controls the second piston using the driving mechanism,
wherein the second measuring space is smaller than the first measuring space and the third measuring space.

10. The apparatus according to claim 1,
wherein the vessels are battery cases, and electrolyte is injected as the liquid.

11. A system that manufactures battery cells by injecting an electrolyte into battery cases in that electrodes are incorporated respectively, the system comprising the apparatus according to claim 1 that injects the electrolyte as the liquid into the battery cases as the vessels.

12. An apparatus that simultaneously supplies a liquid to a plurality of vessels, comprising:
a first measuring unit including a first measuring space inside a first cylinder that is replenished with the liquid and a first piston moving in the first measuring space;
a second measuring unit including a second measuring space inside a second cylinder that is replenished with the liquid and a second piston moving in the second measuring space;
a first dispenser that is connected to the first measuring space and injects the liquid into a first vessel;
a second dispenser that is connected to the second measuring space and injects the liquid into a second vessel;
a driving mechanism that operates the first piston and the second piston in synchronization so as to move up and down with a first stroke;
a first stroke conversion mechanism that is disposed between the first piston and the driving mechanism and independently converts the first stroke of the driving mechanism, and transmits the converted first stroke to the first piston to control an amount of movement of the first piston independently of an amount of movement of the second piston; and
a direct coupling mechanism that directly controls the second piston using the driving mechanism.

13. The apparatus according to claim 12,
wherein the vessels are battery cases, and electrolyte is injected as the liquid.

14. A system that manufactures battery cells by injecting an electrolyte into battery cases in that electrodes are incorporated respectively, the system comprising the apparatus according to claim 12 that injects the electrolyte as the liquid into the battery cases as the vessels.

15. An apparatus that simultaneously supplies a liquid to a plurality of vessels, comprising:
a first measuring unit including a first measuring space inside a first cylinder that is replenished with the liquid and a first piston moving in the first measuring space;
a second measuring unit including a second measuring space inside a second cylinder that is replenished with the liquid and a second piston moving in the second measuring space;
a third measuring unit including a third measuring space inside a third cylinder that is replenished with the liquid and a third piston moves in the third measuring space;
a first dispenser that is connected to the first measuring space and injects the liquid into a first vessel;
a second dispenser that is connected to the second measuring space and injects the liquid into a second vessel;
a third dispenser that is connected to the third measuring space and injects the liquid into a third vessel;
a driving mechanism that operates the first piston, the second piston and the third piston in synchronization so as to move up and down with a first stroke;

a first stroke conversion mechanism that is disposed between the first piston and the driving mechanism and independently converts the first stroke of the driving mechanism, and transmits the converted first stroke to the first piston to control an amount of movement of the first piston independently of an amount of movement of the second piston;

a third stroke conversion mechanism that is disposed between the third piston and the driving mechanism, independently converts the first stroke of the driving mechanism, and transmits the converted first stroke to the third piston to control an amount of movement of the third piston independently of the amount of movement of the first piston and the amount of movement of the second piston; and a direct coupling mechanism that directly controls the second piston using the driving mechanism.

16. The apparatus according to claim 15,
wherein the second measuring space is smaller than the first measuring space and the third measuring space.

17. The apparatus according to claim 15,
wherein the first measuring unit and the third measuring unit are disposed at symmetrical positions with the second measuring unit in the center.

18. The apparatus according to claim 15,
wherein the first measuring unit, the second measuring unit, and the third measuring unit are disposed in that order in a straight line.

19. The apparatus according to claim 15,
wherein the vessels are battery cases, and electrolyte is injected as the liquid.

20. A system that manufactures battery cells by injecting an electrolyte into battery cases in that electrodes are incorporated respectively, the system comprising the apparatus according to claim 15 that injects the electrolyte as the liquid into the battery cases as the vessels.

* * * * *